United States Patent [19]

Homer et al.

[11] Patent Number: 5,344,104

[45] Date of Patent: Sep. 6, 1994

[54] LOW COST, SELECTABLE CONFIGURATION SPACECRAFT

[75] Inventors: Peter K. Homer, Newtown, Pa.;
Robert V. Parenti, Roebling, N.J.;
Joel DeStefano, Westampton, N.J.;
Wensen Chen, Long Valley, N.J.;
Eric Talley, Allentown, N.J.; John E.
Close, East Windsor, N.J.

[73] Assignee: General Electric Co., East Windsor, N.J.

[21] Appl. No.: 948,230

[22] Filed: Sep. 21, 1992

[51] Int. Cl.$^5$ ............................................. B64G 1/00
[52] U.S. Cl. ................................. 244/158 R; 244/172; 244/173; 244/2
[58] Field of Search ................... 244/158 R, 159, 172, 244/173, 2

[56] References Cited

U.S. PATENT DOCUMENTS

| 4,384,692 | 5/1983 | Preukschat | 244/158 R |
| 4,682,744 | 7/1987 | Gounder | 244/158 R |
| 4,880,187 | 11/1989 | Rourke et al. | 244/158 R |
| 4,964,596 | 10/1990 | Ganssle et al. | 244/158 |
| 5,052,640 | 10/1991 | Chang | 244/173 |
| 5,217,188 | 6/1993 | Thole et al. | 244/158 R |

FOREIGN PATENT DOCUMENTS 2569162 7/1978 France.
8601484 3/1986 PCT Int'l Appl..
8603172 6/1986 PCT Int'l Appl..

OTHER PUBLICATIONS

Nat'l Telesystems Conference–IEEE–Conference Records Nov. 1982, Galveston, Tex. pp. B3.4.1–B3.4.5.
"Eurostar, A New Highly Flexible Platform", dated Mar. 17–20, relating to a 1986 presentation.
"Eurostar class" brochure dated 1989 Edition; and later undated Eurostar brochure.

Primary Examiner—Karin L. Tyson
Assistant Examiner—Christopher P. Ellis
Attorney, Agent, or Firm—W. H. Meise; C. A. Berard; S. A. Young

[57] ABSTRACT

To reduce the time required to build spacecraft, and to reduce costs, the spacecraft are members of a set of spacecraft. Each member has the same structural members, such as panels, but different members of the set are elongated by multiples of an increment such as five inches. The structural panels of larger members of the set are elongated in the longitudinal direction, to provide more surface area for mounting payload, and to provide more heat rejection surface. The propellant tank(s), which may be fuel and oxidizer tanks, are spherical in the shortest members of the set, and are increased in length by addition of cylindrical sections, to provide greater volume in larger members to thereby provide longer operating life. Similarly, the solar panels, heat pipes and the like may be elongated.

14 Claims, 15 Drawing Sheets

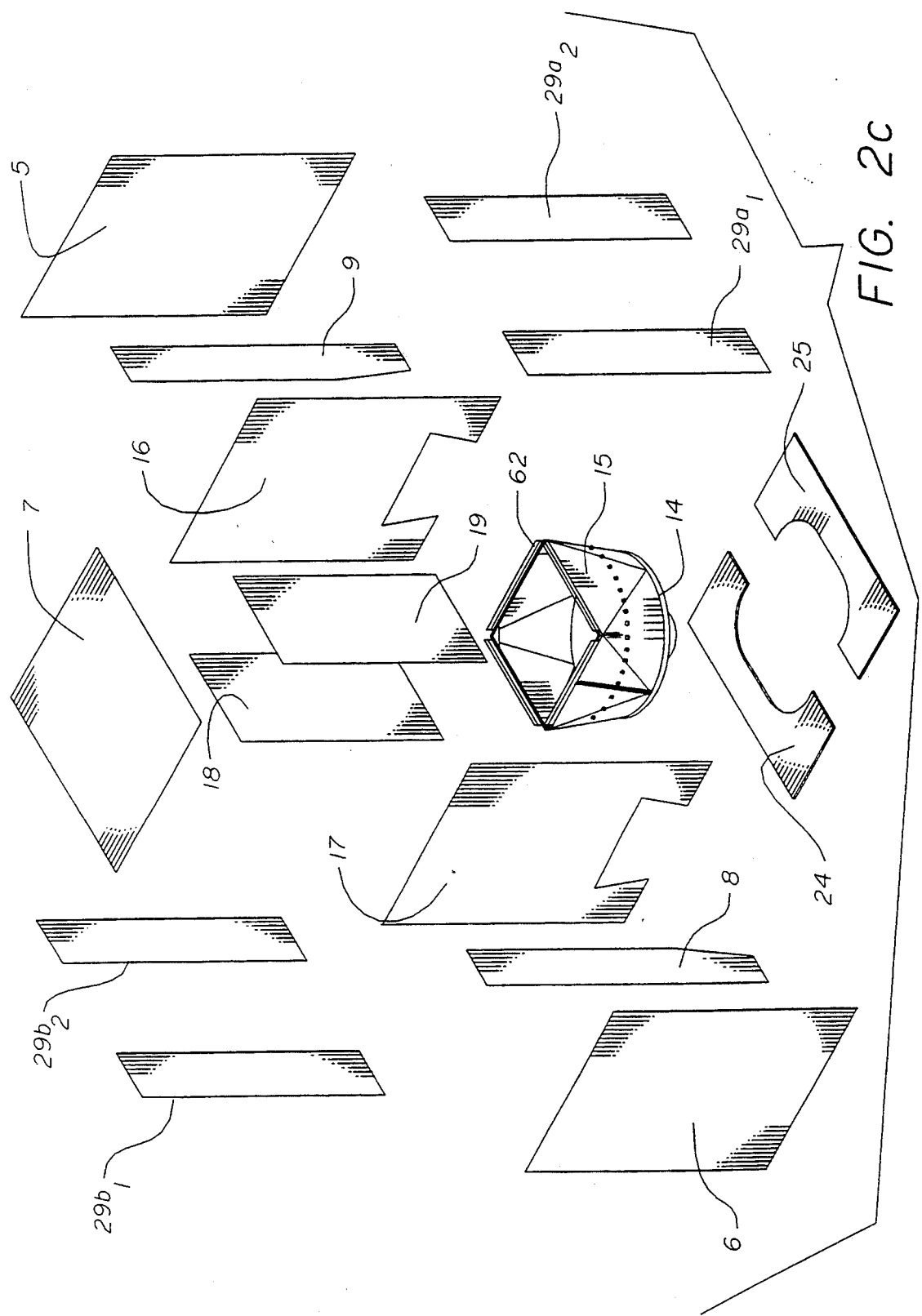

| ROW | COMPONENT | VARIABLE | MAX. | MIN. | INCREMENT |
|---|---|---|---|---|---|
| 1 | FUEL TANK: | LENGTH | 76 in | 36 in | 5 in |
| 2 | OXIDIZER TANK: | LENGTH | 68 in | 28 in | 5 in |
| 3 | SPACECRAFT SIZE: | BOX LENGTH | 85 in | 45 in | 5 in |
| 4 | N-S PAYLOAD PNLS | LENGTH | 85 in | 45 in | 5 in |
| 5 | N-S HEAT PIPE NETWORK | LENGTH | 75 in | 35 in | 5 in |
| 6 | N-S INTERCOSTAL PNLS | LENGTH | 84 in | 44 in | 5 in |
| 7 | N-S BULKHEAD PNLS | LENGTH | 94 in | 54 in | 5 in |
| 8 | E-W INTERCOSTAL PNLS | LENGTH | 76 in | 27 in | 5 in |
|  | SOLAR ARRAY: |  |  |  |  |
| 9 | SUBSTRATE PNLS | AREA (EACH) | 63 sq ft | 63 sq ft | ONE OR OTHER |
| 10 | PANELS PER WING | QTY | 4 | 2 | 1 |
|  | TO ACCOMMODATE C.G. POSITION: |  |  |  |  |
| 11 | UPPER THRUSTERS (FROM S.P.) | HEIGHT | FIXED W.R.T. EARTH PNL | FIXED W.R.T. EARTH PNL | 5 in |
| 12 | ARCJETS (FROM S.P.) | HEIGHT | TBDx | TBDx | ANYxx |
| 13 | LOWER THRUSTERS (FROM S.P.) | HEIGHT | (FIXED) | (FIXED) | (NONE) |
| 14 | MUX EXTENTSION PNLS: | OPTIONAL | — | — | YES OR NO |
| 15 | EARTH HEATPIPES: | OPTIONAL | — | — | YES OR NO |
| 16 | BATTERY CELL PV'S: | QUANTITY | 56 per s/c | 22 per s/c | 2 per battery |

FIG. 4h

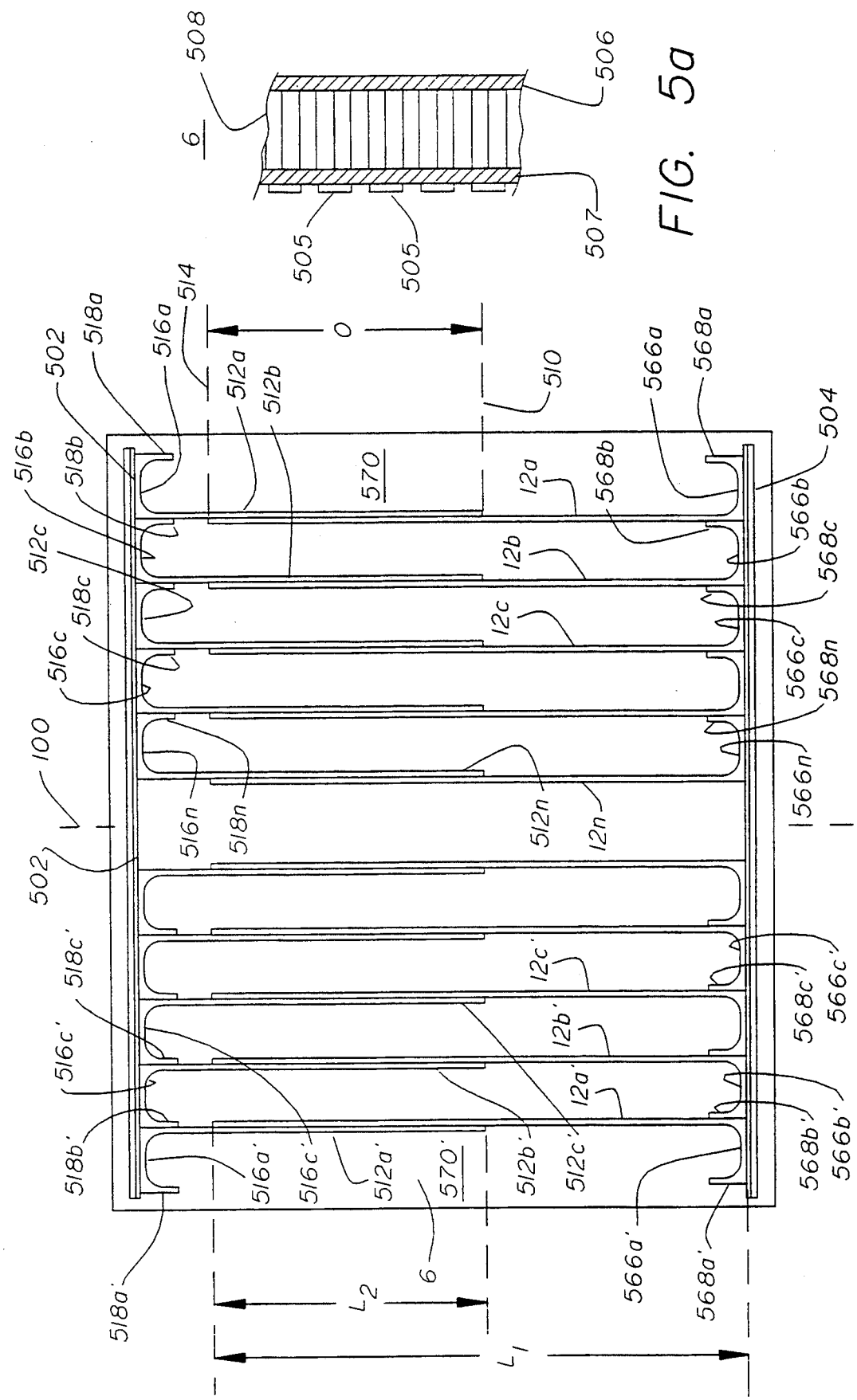

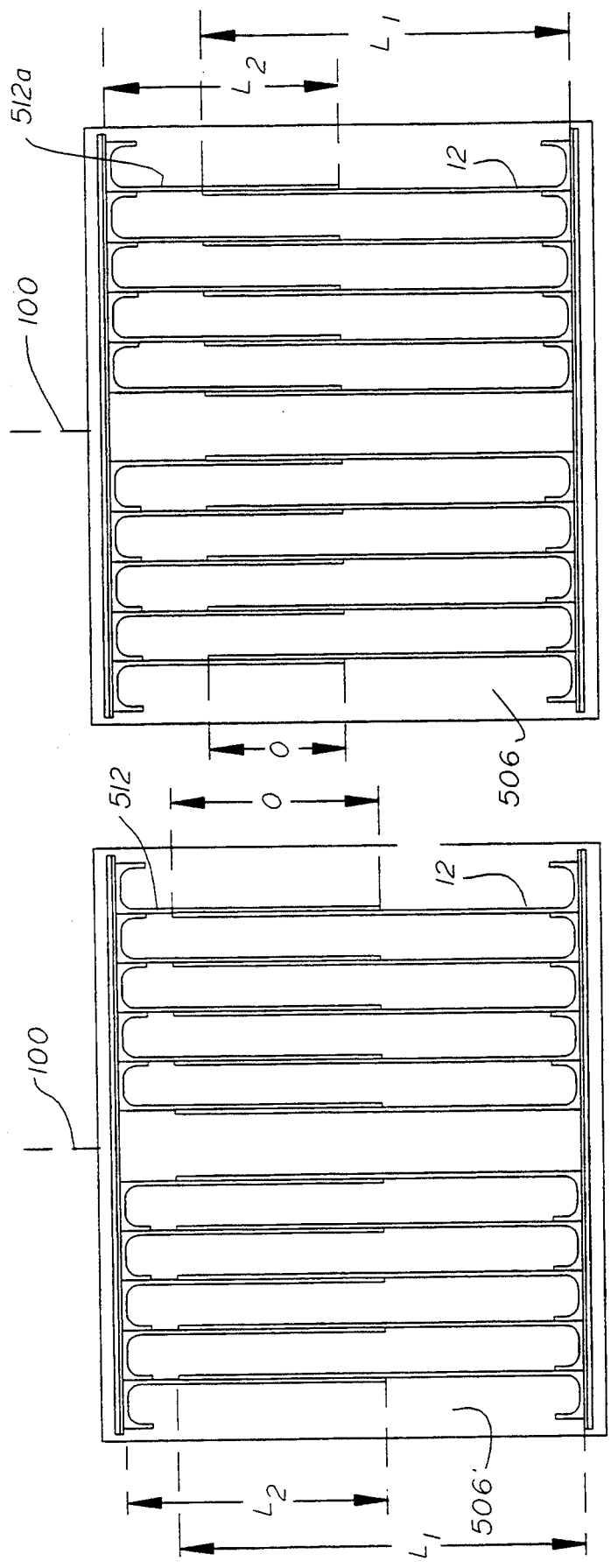

|  | 1a | 1b | 1c |
|---|---|---|---|
| 1 LAUNCH VEHICAL | ATLAS II | DELTA II | ARIANE 0 |
| 2 BUS DRY MASS (Kg) | 750 | 580 | 450 |
| 3 PAYLOAD MASS (Kg) | 450 | 170 | 150 |
| 4 PROPELLANT MASS (Kg) | 1500 | 1030 | 701 |
| 5 LIFT-OFF MASS (Kg) | 2700 | 1780 | 1301 |
| 6 PAYLOAD SET | 24x12W-C 24x60W-Ku | 24x12W-C 24x60W-Ku | 24x12W-C 24x60W-Ku |
| 7 PAYLOAD POWER (KW) | 3.4 | 2.0 | .8 |
| 8 ANTENNA(S) | 2xØ85° DUAL SURF. | 1xØ60° DUAL SURF. | 1xØ60° DUAL SURF. |
| 9 SPACECRAFT BOX L x W x H (in) | 72x72x85 | 72x72x65 | 72x72x50 |
| 10 THERMAL RADIATION AREA (sq ft) | 70 | 50 | 35 |
| 11 OPERATIONAL/ ORBIT LIFT (yr) | 15 | 15 | 15 |

LOW COST, SELECTABLE CONFIGURATION SPACECRAFT

BACKGROUND OF THE INVENTION

This invention relates to spacecraft configurations, and more particularly to spacecraft which can be readily configured from a basic design to adapt to different requirements.

Spacecraft have become important in the fields of communications, military surveillance, monitoring for ecologic conditions, global positioning determination and for weather, including advance notification of storms. The various differing payloads, mission durations and the like make it impossible to use a single spacecraft "bus" to carry the various payloads, because a small bus cannot carry sufficient propellant in addition to its payload for an extremely long mission, whereas a very large bus might be too expensive for the case of a small payload for a short-duration mission. Consequently, the satellite fabrication industry engages in extremely expensive crafting and customization, using such bits and pieces of the design of existing structures as may happen to meet the requirements of the job at hand. The resulting spacecraft must be individually space-qualified, because each differs markedly from the previous spacecraft. The individual crafting and space qualification tends to drive up the cost of the spacecraft and to increase procurement time. Lower costs are desired and shorter procurement times are desired.

SUMMARY OF THE INVENTION

The invention lies in spacecraft which are members of a set of spacecraft. Each member spacecraft of the set defines a longitudinal axis which is in the launch direction. The set of spacecraft includes members in which the overall longitudinal dimensions, parallel to the longitudinal axis, differ by at least one predetermined incremental dimension among members of the set. Each member of the set of spacecraft includes a propellant (fuel, oxidizer and/or monopropellant) tank including an axis of elongation parallel to the longitudinal axis, and with cross-sectional dimensions, orthogonal to the axis of elongation, which are identical to those of corresponding propellant tanks of other members of the set of spacecraft. The dimensions of the propellant tank in the direction of the axis of elongation of the propellant tank differ from those of other members of the set by an integer multiple of a predetermined incremental dimension. The integer multiple may include the integer 1. In a particular set of spacecraft, the predetermined incremental dimension may be five inches.

DESCRIPTION OF THE DRAWING

FIG. 4b represents a range of lengths of the core module, FIG. 4c represents a range of lengths of fuel tanks, FIGS. 4d, 4e, 4f and 4g represent ranges of sizes of transponder panels, solar array panels, oxidizer tanks, and heat pipe assemblies, respectively, and FIG. 4h tabulates some of the principal differences among members of a set of spacecraft.

FIG. 5a is a cross-section of a honeycomb panel, FIG. 5b is an elevation view of the interior of the panel of FIG. 5a in a square configuration, which illustrates details of heat pipes elongated parallel to the axis, and FIGS. 5c and 5d illustrate two alternative embodiments of heat pipe overlap configuration for an elongated panel configuration;

FIG. 7 tabulates the characteristics of three different spacecraft members of a set of spacecraft, designed for launch on three different launch vehicles;

DESCRIPTION OF THE INVENTION

Figure 1:
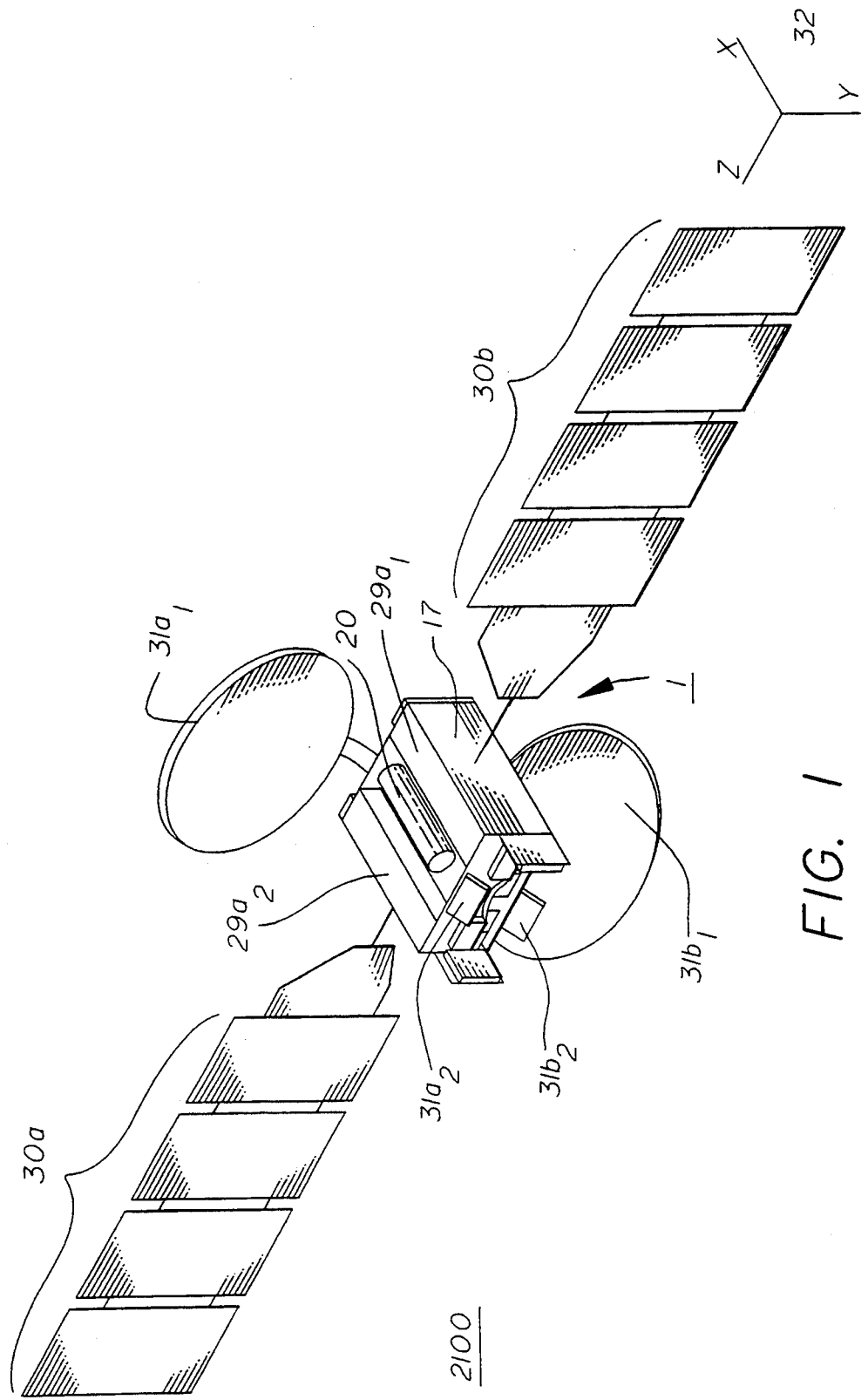
FIG. 1 is a simplified perspective or isometric view of a spacecraft in accordance with the invention, with solar panels and particular antennas deployed.

FIG. 1 illustrates a spacecraft designated generally as 2100, which includes unfurled four-section solar panels designated 30a and 30b, a body designated generally as 1, including access panels 29a1 and 29a2, an oxidizer tank 20, a first mission-dependent antenna system including a dual-polarization reflector 31a1 and its feed 31a2, and a second reflector 31b1 and its feed 31b2.

Figure 2A:
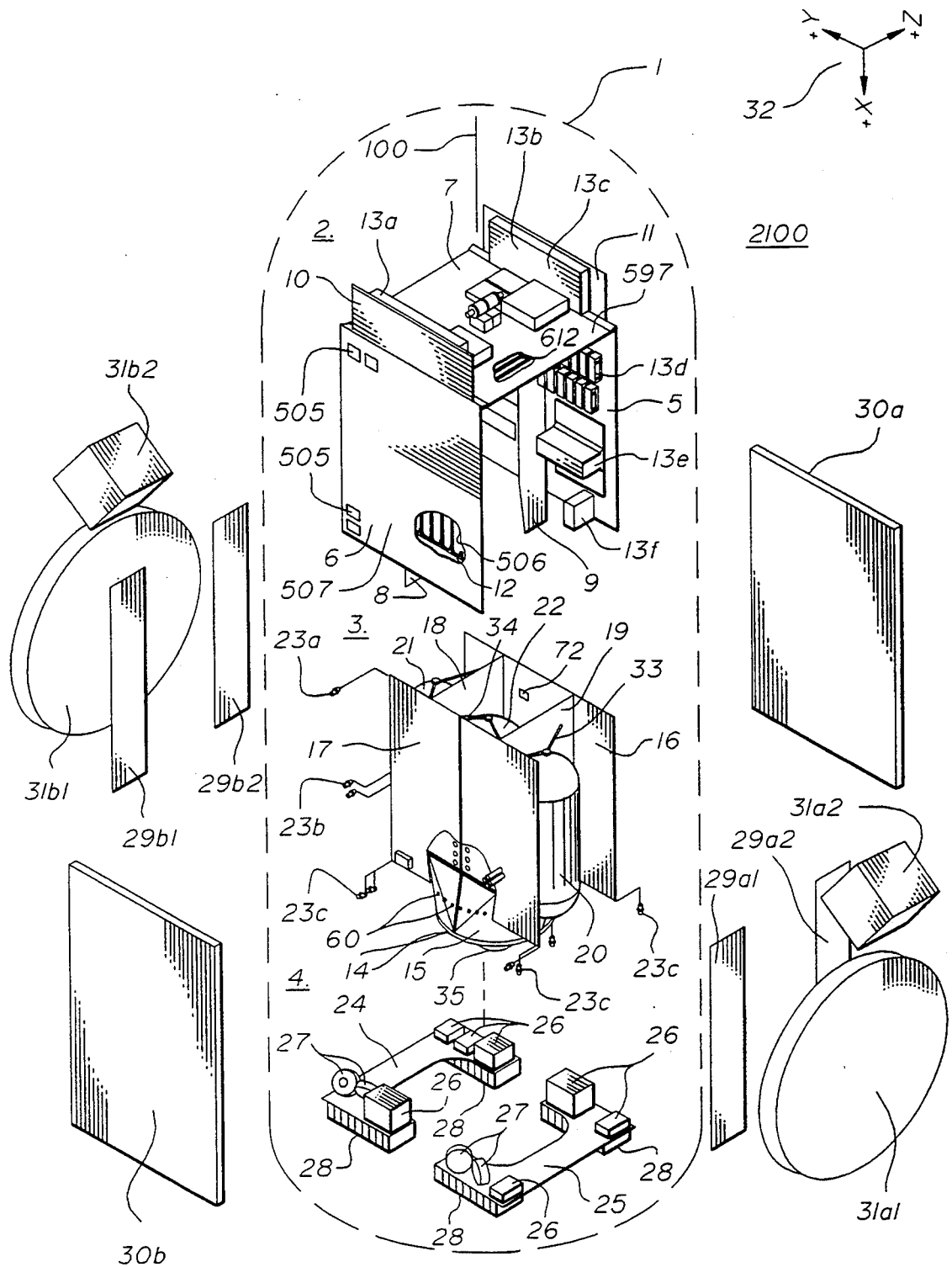
FIG. 2a is a simplified perspective or isometric view, partially exploded and partially cut away, of portions of the spacecraft of FIG. 1 in its stowed state.

FIG. 2a is a simplified, partially exploded perspective or isometric view of spacecraft 2100 of FIG. 1 in its stowed state. In its stowed state, protruding elements, such as solar panels 30a and 30b, and deployed reflectors 31a1 and 31b1 of FIG. 1, are collapsed into close proximity with the main body of the spacecraft, so as to allow the spacecraft in its stowed state to be accommodated within the relatively confined interior of a launch vehicle. Elements of FIGS. 2a, b and c corresponding to those of FIG. 1 are designated by like reference numerals. In FIG. 2a, main body 1 of the spacecraft bus is surrounded by a dash line. Main spacecraft body 1 is generally centered on a longitudinal axis 100. Longitudinal axis 100 is parallel to the axis of a launch vehicle (not illustrated in FIG. 2a). Within main body 1, a payload module portion is designated generally as 2, and includes a north transponder panel assembly 5, a south transponder panel assembly 6, and an earth panel assembly 7, in which the terms "north", "south", "earth" and the like refer to a preferred orientation when the spacecraft is in normal operation. Main body 1 also includes a core module designated generally as 3, which includes a north intercostal panel assembly 16, a south intercostal assembly 17, an east intercostal panel assembly 18, and a west intercostal panel assembly 19, as well as a pair of oxidizer tanks 20 and 21, and a fuel tank 22. Main body 1 also includes a bus module designated generally as 4, which includes an east base panel 24 and a west base panel 25. Main body 1 further includes a south bulkhead panel 8, a north bulkhead panel 9, southwest access panel 29a1, northwest access panel 29a2, southeast access panel 29b1, and northeast access panel 29b2. The various panels and their associated reference numerals are illustrated separately in FIG. 2c. In general, payload module 2 is arranged to be supported by core module 3, and both payload module 2 and core module 3 are provided with attitude control, electrical power control, and other services by bus module 4 after launch.

In addition to main body 1, the structure of FIG. 2a includes a stowed north-side solar array panel assembly 30a, and a stowed south-side solar array panel assembly 30b. Antenna reflector 31a1 and its feed 31a2 are illustrated in close proximity on the west side of the spacecraft. Similarly, on the east side, stowed reflector 31b1 is in close proximity to its feed 31b2. Two sets of access panels designated 29a1, 29a2 and 29b1 and 29b2, are illustrated exploded away from their normal positions, which are between intercostal panel assemblies 16, 17 and corresponding portions of transponder panel assemblies 5 and 6.

FIG. 2 also illustrates a bulkhead panel 8, which lies between south transponder panel assembly 6 and south intercostal panel assembly 17, and a further bulkhead panel 9 which lies between north transponder panel assembly 5 and north intercostal panel assembly 16. An optional extension panel designated 10 extends south transponder panel 6, and a similar panel extension 11 extends north transponder panel 5. Various boxes designated 13a, 13b, 13c, 13d, 13e and 13f are mounted on panel extensions 10 and 11, on earth panel 7 and on the interior of north transponder panel 5. Boxes 13 represent portions of the payload, which may vary from mission to mission.

A portion of the outer surface 507 of south transponder panel 6 and the interior support honeycomb in FIG. 2a is cut away, to reveal portions of heat pipes designated 12 and the reverse surface 506 of panel 6. A portion of the outer surface 597 of earth panel 7 is similarly cut away to reveal portions of its heat pipes 612. The heat pipes are further described below in conjunction with FIGS. 5 and 6. A few of the optical surface radiators (OSRs) 505 are illustrated, mounted on surface 507 of transponder panel 6.

An unmanned launch vehicle such as Atlas, Delta or Ariane generally includes a support or adapter ring which supports the spacecraft during lift into orbit. In FIG. 2a, the launch vehicle adapter ring is illustrated as 14. A transition support illustrated as 15 transfers forces between adapter ring 14 and various panel members of core module 3, such as intercostal panel assemblies 16, 17, 18 and 19. As described below in conjunction with FIGS. 3a, 3b, 3c and 3d, transition 15 is a reinforced composite ring of varying cross-sectional shape, the circumference of which remains constant along its axial length. A series of projecting tabs, individually designated 60, are associated with transition 15, for providing support for base panels 24 and 25 of bus module 4. FIG. 2a also illustrates various attitude control thrusters, which are designated 23, and which are connected by propellant and control lines to core module 3. Bus electrical components 26, reaction or momentum wheels 27, and battery modules 28 are mounted on bus module 4. A portion of an apogee thruster 35 is visible, projecting below core module 3.

Figure 2B:
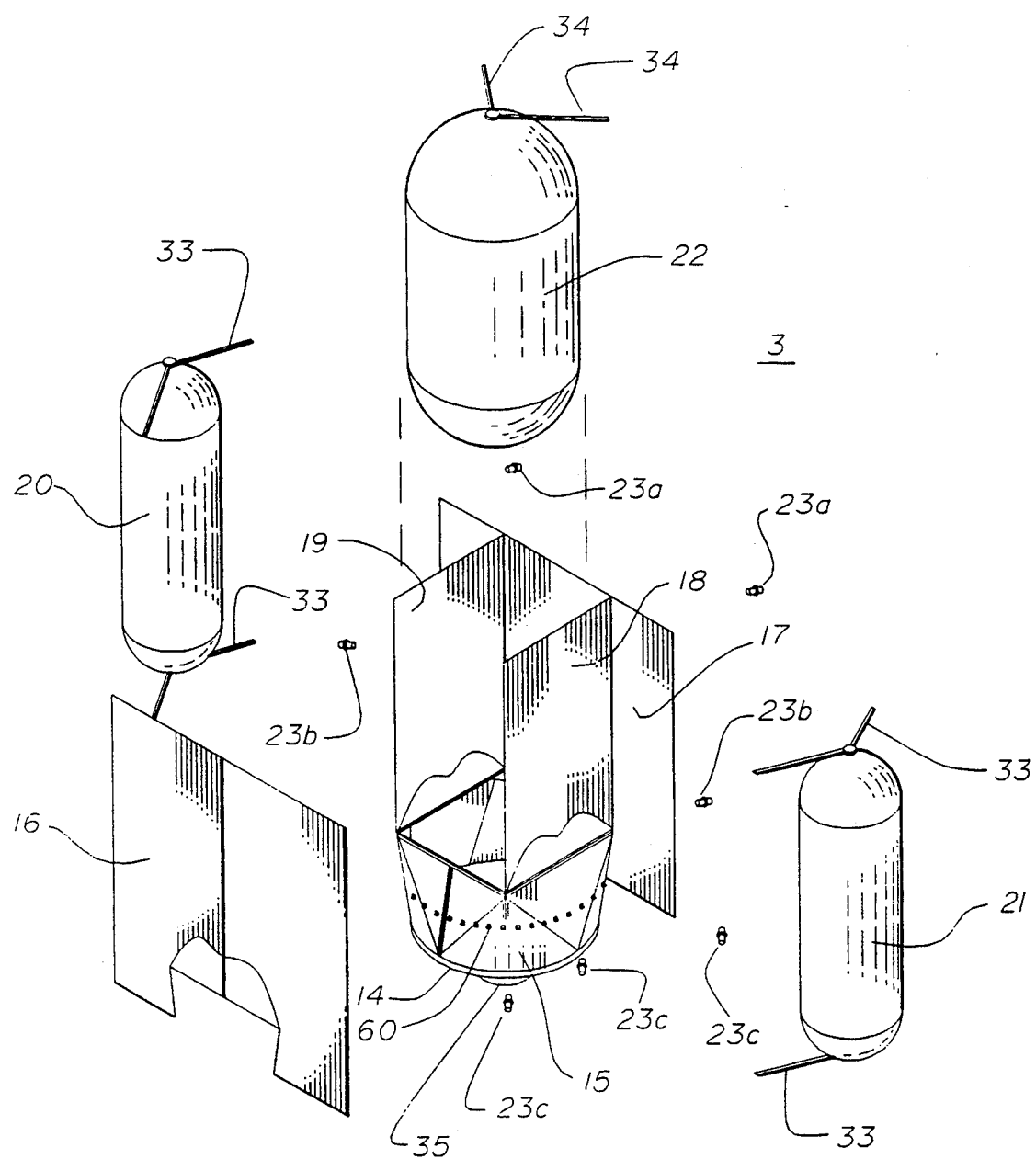
FIG. 2b is a corresponding view, further exploded, of a portion of FIG. 2a, and FIG. 2c illustrates the structural panels alone, exploded away from each other but in their relative positions, with their names and numeral designations.

FIG. 2b illustrates core module 3, further exploded to reveal interior details. Elements of FIG. 2b corresponding to those of FIG. 2a are designated by like reference numerals. In FIG. 2b, the structure of intercostal panel assemblies 18 and 19, and their interface with the upper end of support transition 15 may be seen. Also, it is evident from FIG. 2b that oxidizer tanks 20 and 21 are supported at their tops and bottoms by support struts illustrated as 33, and fuel tank 22 is supported at its top by support struts 34.

Figures 3A, 3B, 3C, 3D:
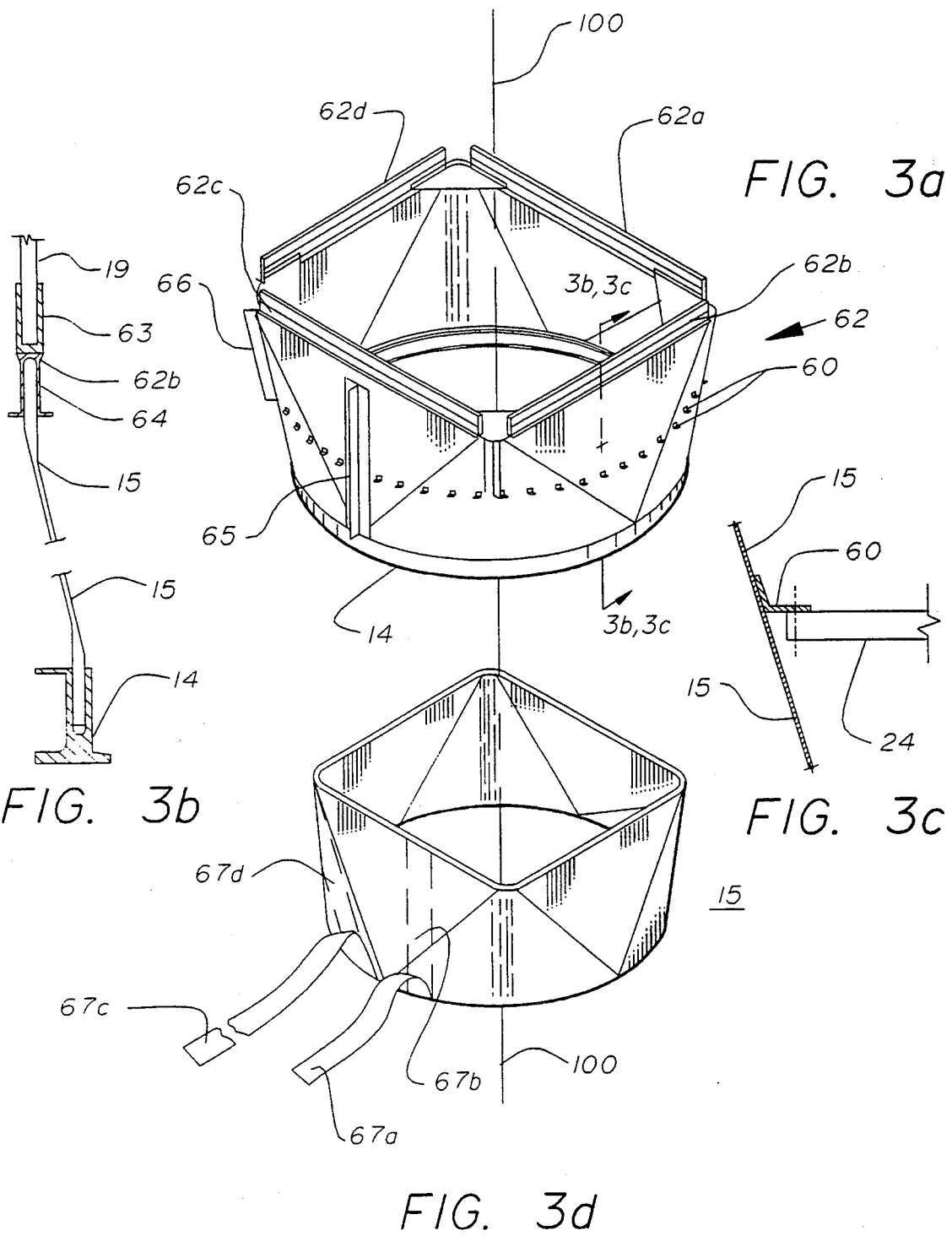
FIG. 3a is a simplified perspective or isometric view of a launch vehicle adapter ring and an associated transition support piece in accordance with an aspect of the invention.
FIGS. 3b and 3c are elevation cross-sections thereof illustrating interfaces between the transition and adjoining structures.
FIG. 3d illustrates the transition piece during a stage of construction, with pieces of reinforcing tape being applied parallel to, and skewed with the longitudinal axis.

FIG. 3a is a perspective or isometric view of launch vehicle adapter ring 14, support transition 15, and upper "ring" 62. Upper ring 62 provides the interface between transition 15 and the intercostal panels 16, 17, 18 and 19 of FIG. 1. Since the intercostal panels are straight, upper support "ring" 62 is formed of straight segments 62a, 62b, 62c and 62d in a square or rectangular configuration. Each section, such as section 62b, of upper support ring 62, includes an upper socket portion 63 dimensioned to accept an intercostal panel, such as intercostal panel 19 illustrated in the cross-sectional view of FIG. 3b. Ring portion 62b of FIG. 3b also includes a lower socket portion 64 dimensioned to accept the upper edge of transition support element 15. As also illustrated in FIG. 3b, launch vehicle adapter support ring 14 includes a lower socket, circular in form, dimensioned to accept the lower edge of transition support structure 15. The spacecraft with its transition support structure is held to launch vehicle adapter support 14 by a clamp band (not illustrated), which is released at the time of separation. Referring once again to FIG. 3a, transition support structure 15 supports the intercostal panels, as mentioned above, by way of upper support ring 62. A portion of the load of the spacecraft is also applied part-way down the transition by a series of protruding tabs 60. Tabs 60, in association with the lower part of transition 15, transfer loads between launch vehicle adapter ring 14 and east and west base panels 24 and 25 of bus module 4, illustrated in FIG. 2a. FIG. 3c is a cross-sectional view through a portion of transition support member 15 at a tab 60, illustrating how protruding tabs 60 are positioned for attachment to east base panel 24. The actual connection may be by an adhesive, bolts, or a combination. Items 65 and 66 of FIG. 3a, and their counterparts (not visible) on the other side of the transition, are protruding tabs for attachment of the transition support to the north and south bulkheads, and north and south intercostal panels, respectively.

FIG. 3d illustrates support transition 15 during its fabrication. As mentioned, support transition 15 is a reinforced composite structure. The upper end of transition 15 has the overall form of a square (or rectangle, or other polygon, if desired) with rounded corners, and the lower end is circular. In one embodiment, the structure is fabricated using carbon reinforcing fiber tape laid up on a mold, and impregnated with a resin matrix. FIG. 3d illustrates a reinforcing fiber tape 67a in the process of being laid from the lower edge toward the upper edge, along a longitudinal track 67b illustrated by dash lines. As mentioned, the circumference of support transition 15 at any plane orthogonal to longitudinal axis 100 is equal to that at any other plane. This has the advantage that, when tapes 67a are laid along longitudinal tracks 67b, they may be laid side-to-side without overlapping at the top, as would be the case if the support transition were smaller in circumference at the top than at the bottom. Consequently, support structure 15 does not become thicker toward the top (due to the overlap of the tapes) compared with the bottom, but remains of the same thickness throughout its axial length. Such increased thickness at the top would undesirably add weight to the vehicle, and provides additional strength in regions in which it is not necessary. The forces during launch are greatest near the bottom of the transition, as a result of torques which act through a moment arm equal to the axial length of the support transition, and also because support tabs 60, described above in conjunction with FIGS. 3a and 3c, cause some of the loads to be applied to support transition 15 half-way down the transition. Thus, strength is needed at the bottom not the top. The constant circumference of support transition 15 has a further advantage, in that a layer of reinforcing fiber tape such as 67c of FIG. 3d, which is applied to the structure along a track illustrated as 67d which is at some selected angle, such as 45°, relative to the longitudinal axis 100, will maintain that same (45°) angle throughout its entire track from the lower edge to the upper edge of the structure. Thus, the known characteristics of successive layers of longitudinal and ±45°-oriented fiber reinforcements can be relied upon. If the circumference were not constant along the length of the transition, the angle of track 67d would vary along its length with the result that, under extreme conditions track 67d might take on angles resulting in a return of the tape to the lower edge rather than continuing to the upper edge. In any case, the angle of the fiber reinforcement could not be guaranteed.

Figure 4A:
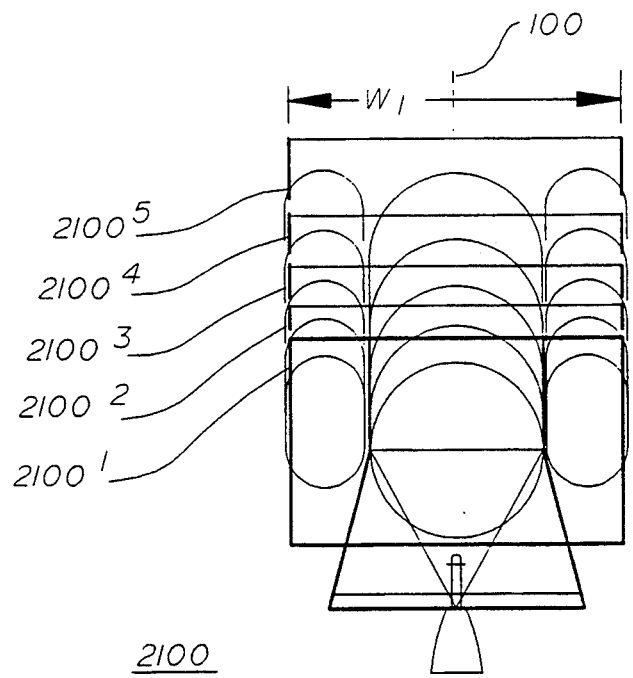
FIG. 4a represents various members of the set of spacecraft, in the form of several different possible configurations which are relatively axially extended by a fixed increment of distance.

FIG. 4a illustrates, superimposed upon one another various members, designated $2100^1$, $2100^2$, $2100^3$... of a set of spacecraft. FIG. 4a is merely illustrative, and the set of spacecraft may have more or fewer members than 5. Each member of the set has an axial length, measured in the direction of longitudinal axis 100, which is different from that of other members of the set. For example, member $2100^1$ of FIG. 4a is shorter than member $2100^2$. The longest member of the set illustrated in FIG. 4a is $2100^5$. The lateral or cross-sectional dimensions W1 of all member spacecraft of the set of spacecraft of FIG. 4a are identical, so that they may be fitted within the same launch vehicle. Naturally, payload-specific portions, while they must lie within the confines of the launch vehicle, may deviate from this requirement.

Figures 4B, 4C:
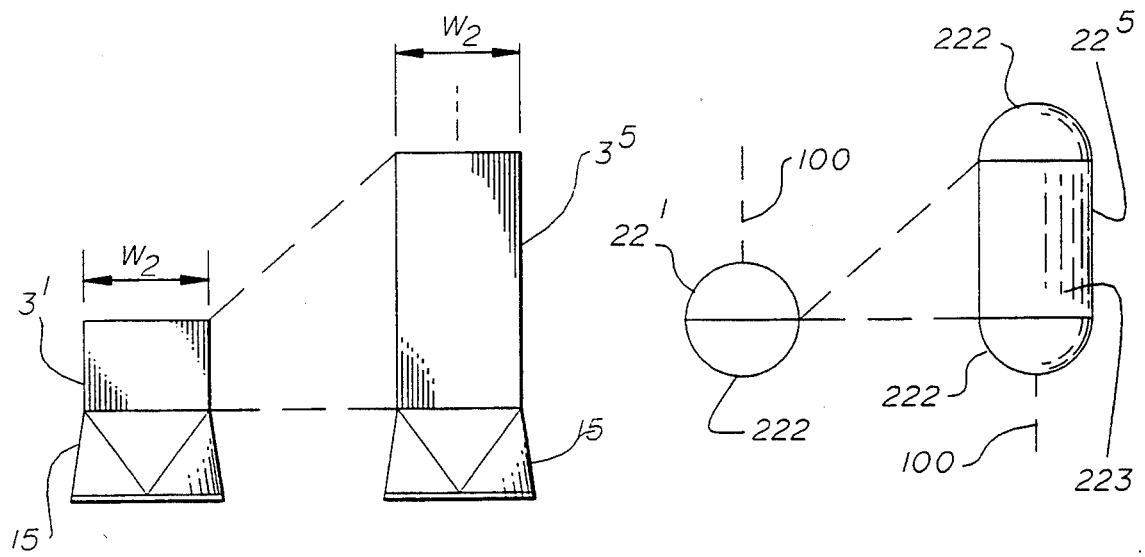
FIGS. 4b–4g represent various principal elements of the members of the set of spacecraft, having major dimensions parallel to the longitudinal axis.

As mentioned, low cost is achieved when certain standardized incremental axial dimensions are used, which as an example may be five inches. The length dimension difference among the members 2100 of the set of FIG. 4a is five inches. FIG. 4b represents a range of sizes of the combination of support transition element 15 and core modules 3 which are associated with the various members of the set illustrated in FIG. 4a. The cross-sectional dimensions, as represented by dimensions $W_2$ of core module $3^1$ and $3^5$ of FIG. 4b, are identical for all members of the set of spacecraft. As illustrated in FIG. 4b, a core module $3^1$ is associated with the shortest axial length member, $2100^1$, of the set of spacecraft illustrated in FIG. 4a. A longer core module $3^5$ is associated with the longest member, $2100^5$, of the set of spacecraft illustrated in FIG. 4a. Other members of the set of spacecraft of FIG. 4a having axial lengths lying between the extremes will have core module lengths lying between the two lengths illustrated in FIG. 4b. FIG. 4c illustrates a spherical fuel tank $22^1$, which is associated with the shortest member, $2100^1$, of the set of spacecraft of FIG. 4a. As illustrated, fuel tank $22^1$ is made up of two hemispheres 222. FIG. 4c represents a range of fuel tank sizes created by adding cylindrical portions, such as cylindrical portion 223, between hemispheres 222. Cylindrical portion 223, together with end hemispheres 222, form a fuel tank $22^5$ elongated in the direction of axis 100, which is associated with the longest member of the set of spacecraft of FIG. 4a, namely member $2100^5$. Other spacecraft of the set will have fuel tanks 22 with lengths lying between the lengths illustrated in FIG. 4c, by addition of other lengths of cylindrical portion 223. The length increments of cylindrical portions 223 of the fuel tanks are five inches, to correspond to the other length increments illustrated in FIGS. 4a through 4g. It will be clear that all of the fuel tanks $22^1 \ldots 22^5$ of FIG. 4c will have identical cross-sectional dimensions in a plane perpendicular to longitudinal axis 100. The increased length of fuel tank provided by the addition of cylinder 223 increases the tank's volume, so a longer spacecraft can carry more fuel, without being larger in lateral dimensions. This method of increasing the volume of the tank is particularly important, because the incremental cylindrical tank portion does not result in a need to space-qualify the different volume tank.

Figure 4D:
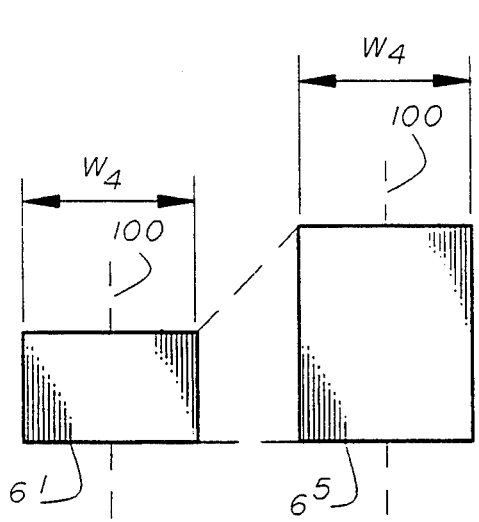

FIG. 4d represents a south transponder panel assembly $6^1$ having a first length in the direction of axis 100, and represents a range of sizes in predetermined increments of five inches, up to a length represented by south transponder panel assembly $6^5$. The width dimension W4 of panel $6^1$ is equal to that of panel $6^5$. The longest panel assembly $6^5$ is associated with the longest member spacecraft, member $2100^5$, of the set of spacecraft illustrated in FIG. 4a, while panel $6^1$ of FIG. 4d represents the south transponder panel assembly associated with the shortest member spacecraft, member $2100^1$, of the set of FIG. 4a. The overall dimensions of body 1 of the spacecraft of FIG. 2a are established at least in part, by the widths of transponder panels 5 and 6, and in the other direction by the widths of intercostal panels 18 and 19 and bulkhead panels 8 and 9. So long as the widths of these panels are identical among members of a set of spacecraft, the cross-sectional dimensions of the spacecraft will be the same from one member of the set to the other. Naturally, other panel assemblies, such as those described in detail in conjunction with FIGS. 2a, 2b and 2c, may be extended in axial length in a similar manner. The increase in the axial length of the transponder panels of longer spacecraft of the set, compared with shorter spacecraft, increases the heat rejection capability of the spacecraft relative to a shorter spacecraft. Therefore, a longer spacecraft of a set can carry a higher power payload, without change in the lateral dimensions, than a shorter spacecraft. The increase in axial length of the transponder panels of longer spacecraft of the set also increases the available mounting area and volume available for mounting payload boxes.

Figure 4E:
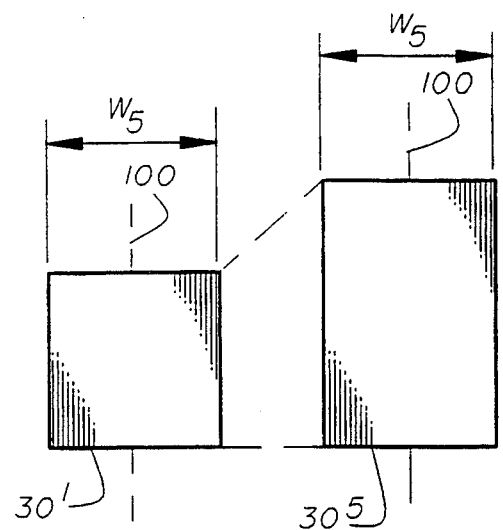

FIG. 4e represents a solar panel $30^1$, which has a dimension in the direction of axis 100 which is less than the corresponding dimension of another solar panel $30^5$, but all of which have a common lateral dimension $W_5$. FIG. 4e represents a range of values in predetermined increments of five inches. Each solar panel represented by FIG. 4e is associated with a corresponding length member spacecraft of the set of spacecraft of FIG. 4a, for providing greater surface area notwithstanding the constant panel width $W_5$, to thereby provide, when deployed, increased power generation for the longer spacecraft.

Figure 4F:
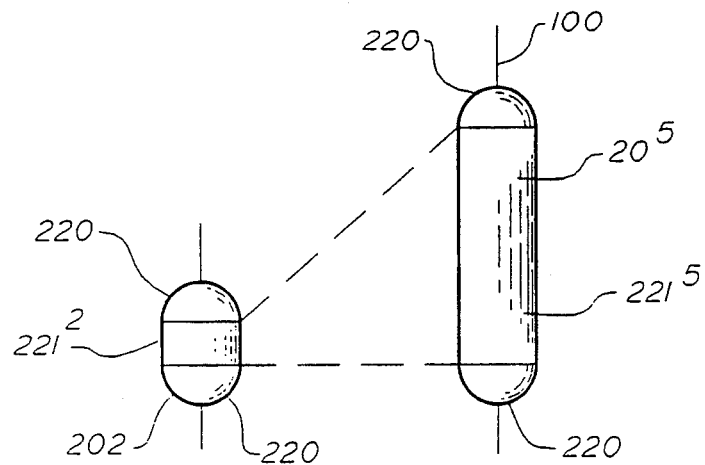

FIG. 4f represents a range of oxidizer tanks which may be used with the various different length members of the set of spacecraft of FIG. 4a. The smallest member of the set of tanks illustrated in FIG. 4f is designated $20^2$, suggesting that the set may include a smaller member tank, if desired, which would be in the form of a sphere (not illustrated) including two hemispheres 220. As illustrated, member $20^2$ is formed of two hemispheres 220, together with a cylindrical portion $221^2$. The largest tank of FIG. 4f is designated $20^5$, and includes hemispheres 220 and a longer cylindrical portion $221^5$. The diameters of hemispheres 220 are identical, so the cross-sectional dimensions of all oxidizer tanks $20^x$ of a set of spacecraft are identical, where superscript x is an index representing any one of the members. The volume of tanks 20, of course, increases with increasing length, so more oxidizer can be fitted within a longer member of the set of spacecraft than within a shorter member, without further space qualification.

Figure 4G:
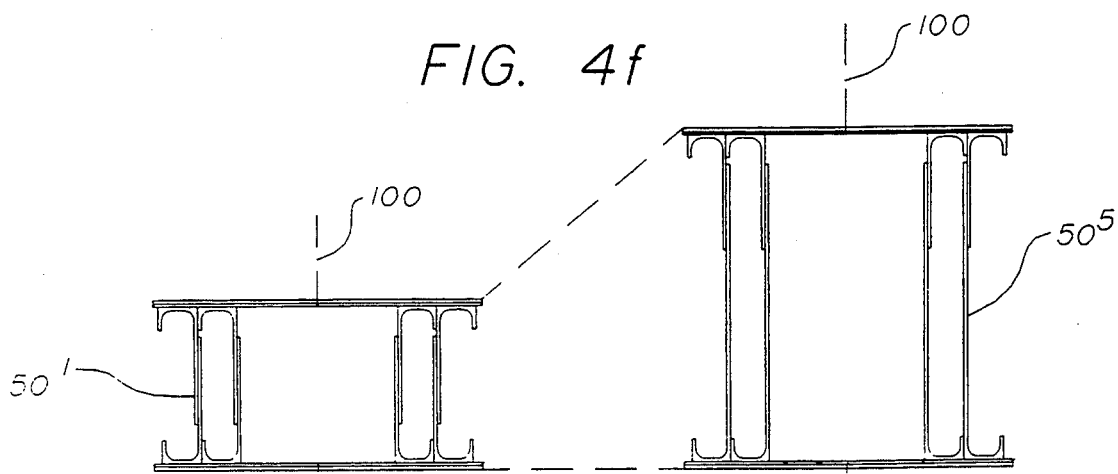

FIG. 4e represents as structures $50^1$ and $50^5$, heat pipe assemblies of various lengths, each of which may be associated with a panel, such as a transponder panel, of a member of the set of spacecraft of FIG. 4a. The heat pipe assemblies are further described below in conjunction with FIGS. 5 and 6. As illustrated in FIG. 4g, "vertical" portions of the heat pipes may be elongated in a direction parallel with longitudinal axis 100. The lengths of the heat pipes may be adjusted in increments to adjust the area available for thermal radiation to match the panel heat rejection capability to the requirements of high or low power payloads. Thus, while the panels change dimensions, the heat pipe structures may or may not change length, depending upon the payload heat load.

FIG. 4h tabulates some of the variables associated with a particular set of spacecraft being planned. Row I indicates that the fuel tank length ranges from a minimum of 36 inches in the longitudinal direction to a maximum of 76 inches, in 5-inch increments. Rows II through VIII are self-explanatory. Row IX indicates that the solar array panels each have a maximum area of 63 square feet, and a minimum of 40 square feet, and "one or the other" means that the initial plans, for cost and manpower reasons, is limited to one increment, which is a multiple of five inches. It is expected that later spacecraft members of the set will include intermediate dimensions. As also listed in Row XI of FIG. 4h, upper thrusters 23a, illustrated in FIGS. 2a and 2b, are fixed with respect to earth panel 7, and as the transponder panel lengths increase in 5" length increments, upper thrusters 23a also become more distant from the launch vehicle separation plane (S.P.) by 5" increments. The position of arcjets 236 listed in Row XII is "TBD", to be determined based on the specifics of the mission and the resulting location of the center of gravity (CG). The lower thrusters 23c are at a fixed height with respect to the launch vehicle separation plane. The multiplex (MUX) extension panels 616 listed in Row XIV and the Earth heat pipes in Row XV are described in conjunction with FIG. 6a. The number of nickel-hydrogen battery cell pressure vessels (PVs) are listed in Row XVI.

FIG. 5a is a cross-section of a portion of south transponder panel 6 of FIG. 2a, illustrating an inner face sheet 506, face sheet 507, and an interior low density core in the form of a honeycomb 508. As known, the face sheets and honeycomb are conventionally made from aluminum for low cost, light weight and good thermal conduction, but may be of other materials. In particular, face sheets of carbon fiber reinforced resin are contemplated. FIG. 5b is an elevation view of panel 6 with face sheet 507 and the honeycomb filling 508 removed, to expose the heat pipes extending therethrough. As illustrated in FIG. 5b, a first "header" heat pipe 502 extends from left to right across the top of panel 6, and a second header heat pipe 504 extends from left to right across the bottom of the panel. Also in FIG. 5b, a first set of heat pipes, designated generally as 570, lying between header heat pipes 502 and 504, includes a heat pipe 12a, which has a straight portion which extends upwardly from header 504 to a plane 514 transverse to axis 100. Heat pipe 12a includes, in addition to the straight portion, a portion in the general shape of a letter "J", with a bottom portion 566a in thermal contact with header pipe 504, and with a "hook" portion 568a which extends upwardly a short distance away from header heat pipe 504. The "hook" portion of the heat pipe is a location in which excess heat transfer liquid tends to accumulate when ambient conditions create such an excess. Heat pipe set 570 of FIG. 5b includes another heat pipe designated 512a, which also includes a straight portion which extends downwardly from header heat pipe 502 to a transverse plane 510 which lies below transverse plane 514. Heat pipe 512, in addition to the straight portion described above, also includes a portion in the general shape of the letter "J", including a "bottom" portion 516a and a "hook" portion 518a which extends downwardly a short distance. In an overlap region O lying between transverse planes 510 and 514, the straight portions of heat pipes 12a and 512a are juxtaposed and in thermal contact.

A plurality of additional sets or pairs of heat pipes 12, 512 are arranged between upper header heat pipe 502 and lower header pipe 504. For example, a heat pipe 12b includes a straight portion extending upwardly from header heat pipe 504 to transverse plane 514, and a J-shaped portion including a bottom portion 566b in thermal contact with header 504, and a hook portion 568b extending upwardly a short distance from header 504. The hook portion of heat pipe 12b is in thermal contact with heat pipe 12a. Heat pipe 12b is juxtaposed in region O with a straight portion of a heat pipe 512b, which extends downward from header 502, and which also includes a bottom portion 516b extending along header 502, and a hook portion 518b, extending downwardly from header heat pipe 502, which is in contact with the straight portion of heat pipe 512a. Additional heat pipe pairs 12c, 512c . . . 12n, 512n, each with its associated bottom portion 566c, 516c . . . 566n, 516n and hook portion 568c, 518c . . . 568n, 518n, respectively, provide heat distribution throughout panel 6. An additional set of heat pipes similar to that described above, and designated generally as 570', is symmetrically disposed about axis FIG. 5b relative to set 570. The numbering of heat pipes of set 570' is the same as that of the heat pipes of set 570, with the addition of a prime. As mentioned, FIG. 5b represents south transponder panel 6 of FIG. 2a, and a similar set of heat pipes is embedded within north transponder panel 5, as illustrated below in conjunction with FIG. 6a.

In general, one of north or south transponder panels 5 or 6 of FIG. 2a will be facing a cold region of space, and will not be subject to heat loading from the sun. That transponder panel will radiate thermal energy to space through its optical surface radiators (OSRs) 505. Heat pipes 12 and 512 associated with panel 6 distribute heat "vertically" through the panel to tend to equalize temperature. Overlap region O is particularly suited for the mounting of higher-power portions of payload modules 13 (FIG. 2a), because heat generated within overlap region O is carried both upward (by heat pipes 512) and downward (by heat pipes 12).

As mentioned in conjunction with FIGS. 4a–4g, the heat rejection capability of the transponder panels increases as the dimension of the heat pipe network in the direction of axis 100 increases. FIG. 5c illustrates a south transponder panel 506, with a heat pipe network 12, 512 which is axially extended compared with that of FIG. 5b (longer in the direction of axis 100 than in the panel of FIG. 5b), but in which individual the heat pipes 12, 512 have the same physical lengths as in FIG. 5b. That is, lengths L1 of heat pipes 12 of FIG. 5b are equal to lengths L1 of heat pipes 12 of FIG. 5c, and lengths L2 of heat pipes 512 of FIG. 5b are equal to lengths L2 of heat pipes 512 of FIG. 5c. Overlap region $O^1$, however, is shorter than overlap region O of FIG. 5b, so the area within which higher power payload components may be installed is smaller. Such an arrangement, in which different members of a set of spacecraft have the same length heat pipes, notwithstanding that the panel itself and the heat pipe network are longer, is advantageous when heat pipes of a particular length are stocked in inventory, and cutting is not desired.

FIG. 5d illustrates a panel $506^2$ corresponding to panel 506 of FIG. 5c in dimensions, but in which heat pipes 12 and 512 are lengthened to lengths $L_1^1$ and $L_2^1$, respectively, to maintain overlap region O identical in size to overlap region O of FIG. 5b. Both extended panels 506 and $506^2$ have the same area, and therefore ultimately have the same heat rejection capability for a given temperature rise, but the heat distribution capability and thermal radiation in the presence of high power payload components will be improved in the arrangement of panel $506^2$ of FIG. 5d. Such an arrangement, in which the heat pipes themselves are adjusted in length, may be desirable when long heat pipes can be fabricated, which are pinched off, cut at the pinch, and welded closed, to produce the desired length.

Figure 6A:
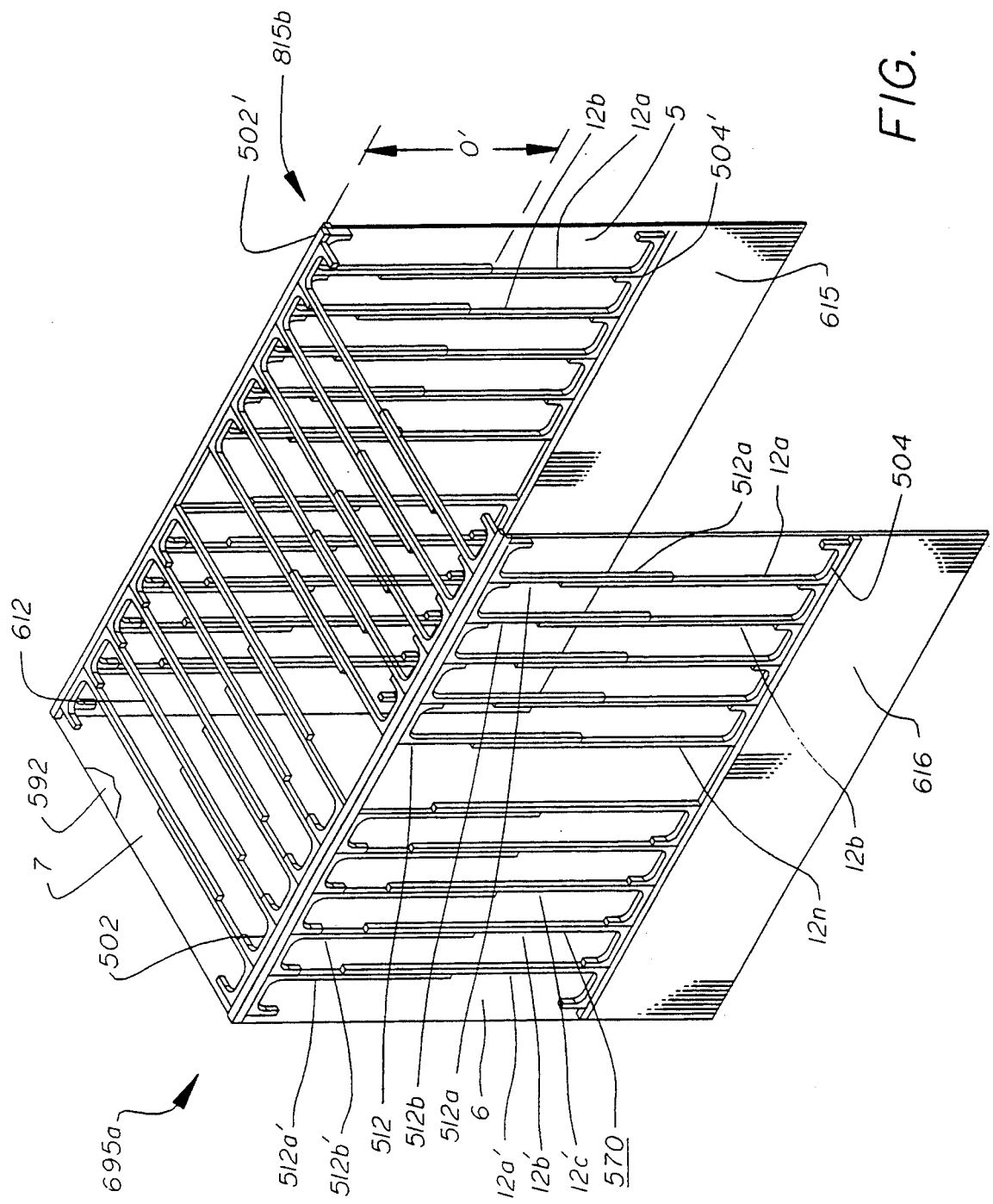
FIG. 6a is a simplified, skeletonized, perspective or isometric view of an assemblable-disassemblable 3-dimensional heat pipe arrangement for carrying heat among three panels of the spacecraft of FIG. 1.

FIG. 6a represents north and south transponder panels 5 and 6, and earth panel 7 of FIG. 2a, skeletonized by removal of OSRs 505, surface sheets 507 and honeycomb core 508 of panel 6, and by removal of most of a surface sheet 597, and all of the honeycomb of panel 7 to expose the entire heat pipe configuration of those panels. In FIG. 6a, the heat pipe arrangement of panel 6 is similar to that described in conjunction with FIG. 5b, and corresponding elements are designated by the same reference numerals. Elements of north transponder panel 5 corresponding to those already described in conjunction with south transponder panel 6 are designated by the same reference numerals primed. In FIG. 6a, a set of heat pipe pairs, one of which is designated as 612, is incorporated into earth panel 7. Heat pipes such as 612 are in juxtaposed pairs, with J-shaped ends, similar to the heat pipe pairs 12, 512 of transponder panel 6. The J-shaped ends of heat pipe pairs 612 of earth panel 7 abut header pipes such as 502 or $502^1$. This allows heat flow across panel 7, from header 502 to header $502^1$, and vice versa. The heat transfer from panel to panel is accomplished in a heat transfer region designated 695, as for example heat transfer between panels 6 and 7 occurs in heat transfer region 695a, and, between panels 5 and 7, region 695b. The arrangement illustrated FIG. 6a has the advantage that, when one of north or south transponder panels 5 or 6 is hotter than the other, as may occur, for example, due to sun loading or due to an unbalanced heat load, heat will travel upward along that transponder panel, will transfer by way of a header heat pipe 502 in a heat transfer region 695 to the heat pipes 612 of earth panel 7, through heat pipes 612 to the header pipe of the other, cooler one of the north or south transponder panels, and will raise the temperature of the initially cooler panel. The increased temperature results in rejection of the heat. Also, the header heat pipe tends to decrease transverse temperature gradients across the panels. Thus, the heat rejection capability of the spacecraft as a whole is enhanced. Additionally, that portion of the heat load produced by payload components, such as components 13a, 13b, and 13c of FIG. 2a which are mounted on earth-facing panel 7, which exceeds the heat rejection capability of panel 7, is transferred efficiently along heat pipes 612 to header pipes 502, $502^1$, and transferred to the transponder panels 5 and 6 for rejection thereby. Regions 615 and 616 of north and south transponder panels 5 and 6 lack heat pipe temperature transfer capability. These regions, which may vary in size, may be used for mounting of low-power equipment. Thus, the Earth panel 7 may be used for mounting of equipment, as well as the transponder panels 5 and 6. The available mounting areas may therefore be more fully populated, with a resulting reduction in overall spacecraft size.

Figure 6B:
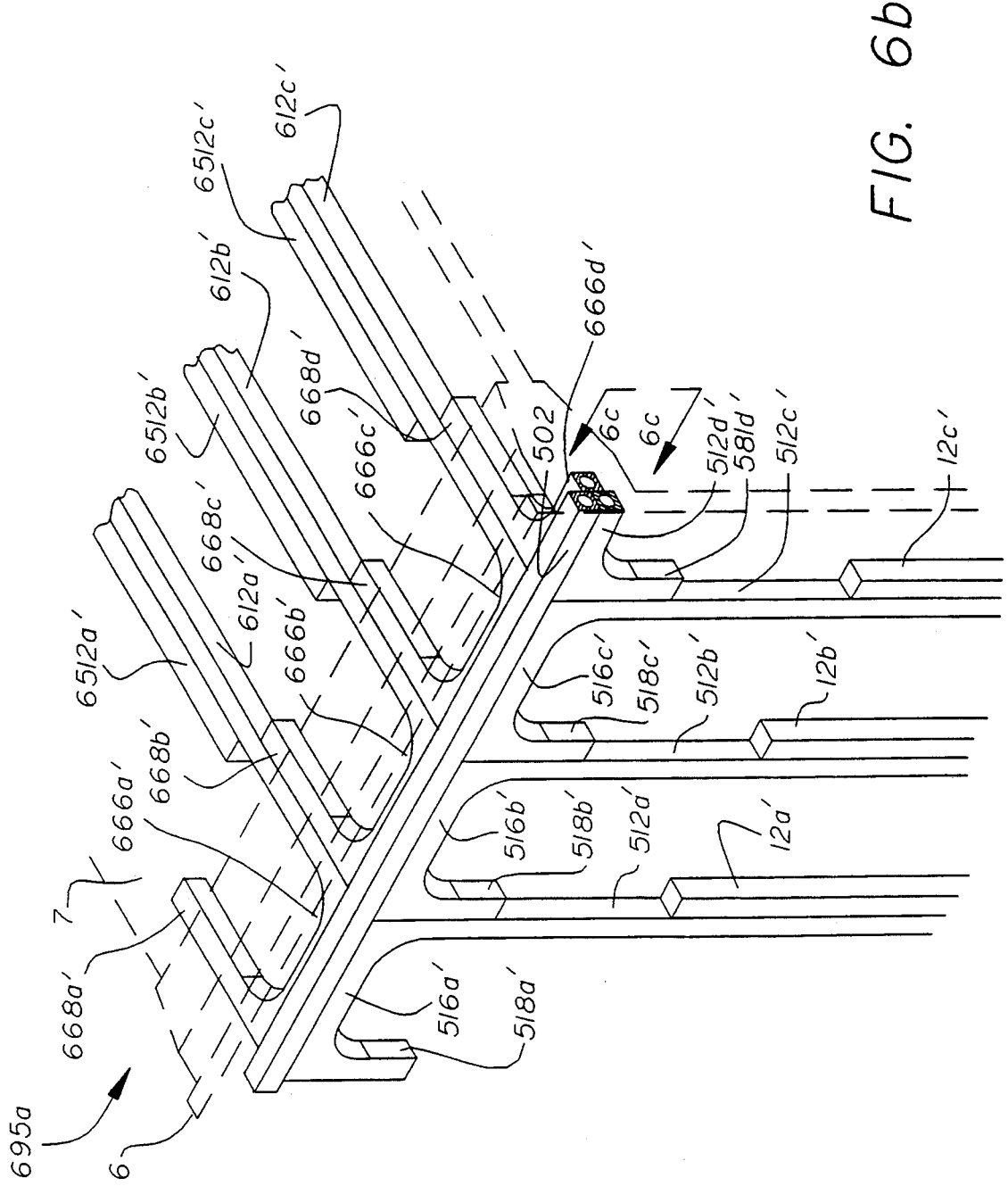
FIG. 6b is a simplified perspective or isometric view of a corner of the structure of FIG. 6a, partially in phantom, and partially cut away, to illustrate the relationship of the various heat pipes.

FIG. 6b is a detail of FIG. 6a, illustrating thermal components in a portion of the juncture of south transponder panel 6 and earth panel 7. Elements of FIG. 6b corresponding to those of FIG. 6a are designated by like reference numerals. In FIG. 6b, the cross-sectional exterior shape of the heat pipes is seen to be square. This provides flat surfaces for maximum heat transfer among the heat pipes. The 3-dimensional "J" shape precludes incorrect orientation during installation of the heat pipes. However, square cross-section is desirable, because the "J's" may be bent in the wrong plane, and even in a region of straight heat pipes using a rectangular cross-section other than square, adjacent heat pipes might be differently oriented, and the panel sheet would make good thermal contact with the "taller" pipe, but would have to deform away from a flat condition to contact the adjacent "shorter" heat pipe. As illustrated in FIG. 6b, heat pipe 512a' on panel 6 has a straight lower portion in contact with the straight upper portion of heat pipe 12a', its bottom portion 516a' in contact with header heat pipe 502, and its hook portion 518a' thermally free. Also in panel 6, heat pipe 512b' has its bottom portion 516b positioned adjacent header 502, and its hook portion 518b' positioned adjacent the straight portion of heat pipe 512a. On earth panel 7, a corresponding set of "J" shaped heat pipes 612, 6512, is similarly arranged. For example, heat pipe 612a' has a straight portion lying against a straight portion of a heat pipe 6512a', a bottom portion 666a' positioned somewhat offset, overlapping a portion of header heat pipe 512 and also a portion of the bottom portion 516a' of south panel 7 heat pipe 512a', and a free hook portion 668a. Similarly, another heat pipe 612b' of earth panel 7 includes a straight portion in thermal contact with a straight portion of a heat pipe 6512b', and also has a bottom portion 666b' lying in an overlapping relationship against both header heat pipe 502 and the bottom portion 516b' of heat pipe 512b', and further has its hook portion 668b' against the straight portion of heat pipe 612a'. The relationship of the other heat pipes of panels 6 and 7 in the region near header pipe 502 will be understood from FIG. 6b without additional description.

Figures 6C, 6D, 6E:
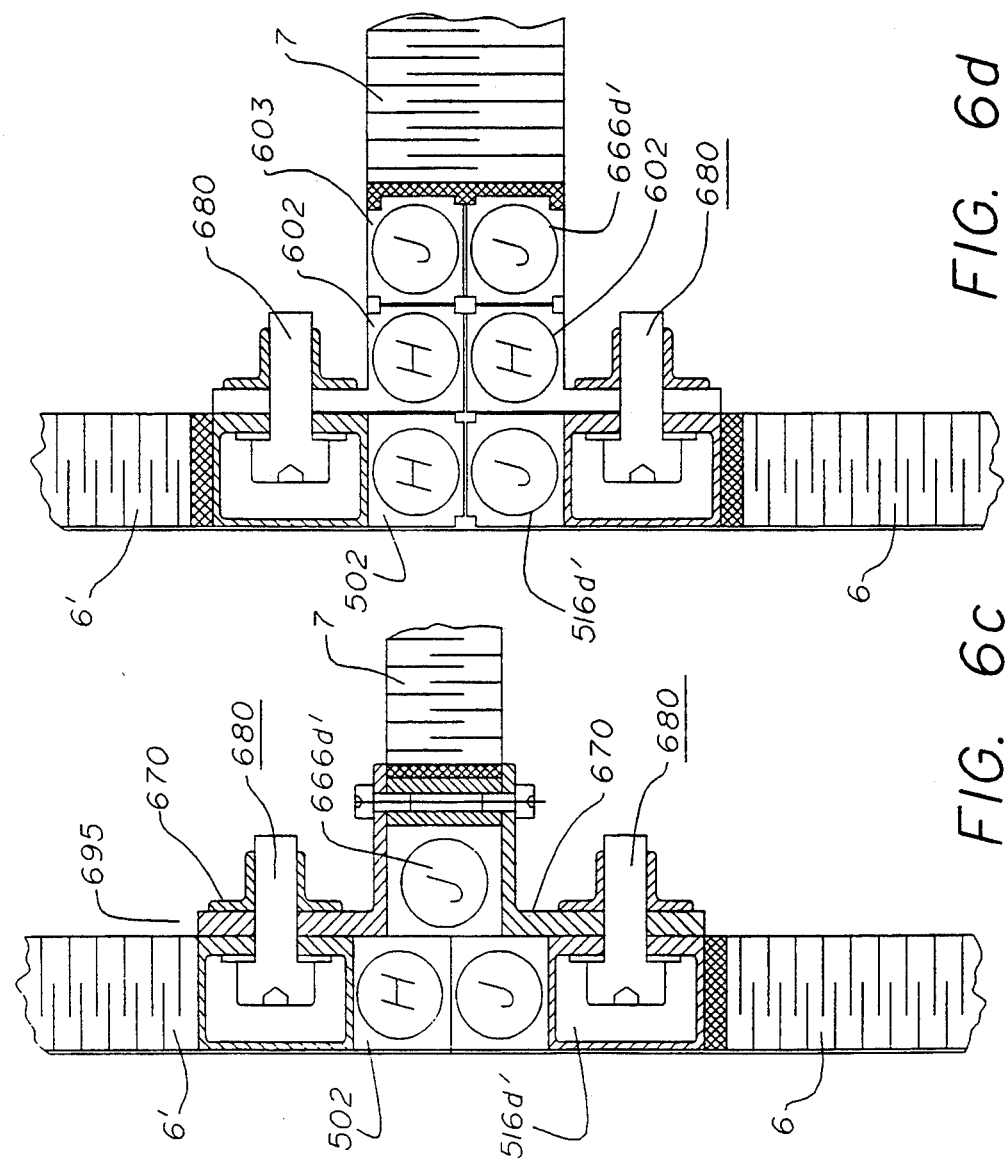
FIG. 6c is a cross-sectional view of one embodiment of the juncture of two panels of FIG. 6a, and FIGS. 6d and 6e represent alternative embodiments.

FIG. 6c is a view of the panel junction of FIG. 6b looking in the direction of section lines 6c—6c. In FIG. 6c, elements corresponding to those of FIG. 6b are designated by like reference numerals. Also, the letter "J" has been added to identify the "J"-shaped portion of a heat pipe, and the letter "H" identifies a header heat pipe. In FIG. 6c, the overlapping position of the "J" bottom portion 666d' relative to header heat pipe 502 and the "J" bottom portion 516d' is evident.

South transponder panel 6 as illustrated in FIG. 6c is fastened to earth panel 7 by fasteners, designated generally as 680, which connect through panel 6 (and an extension designated 6', if desired) into a flange 670 associated with panel 7. A thermally conductive grease, or other thermally conductive material or gasket, may be applied between the flange and panel 6 to improve heat transfer in heat transfer region 695. One thermally conductive material currently being evaluated is Grafoil, a sheet gasket material produced by Union Carbide.

FIG. 6d illustrates another embodiment, similar to FIG. 6c, but in which two additional header heat pipes 602 provide increased heat transfer along the junction, and an additional set of heat pipes 603 extends through earth panel 7, to increase the heat flow capacity. FIG. 6e shows yet another embodiment, with two header heat pipes and two "J" portions in earth panel 7, and with two header heat pipes and one "J" section in the adjacent south transponder panel 6.

When prior art spacecraft panels support electrical equipment such as RF power amplifiers, they also include controllable heaters associated with each amplifier, which heaters are designated to dissipate about the same amount of heat as the associated RF power amplifier. When an amplifier has its energizing power removed, as when it is taken off-line, the associated heater is switched on, to thereby help to maintain thermal balance. Since the spacecraft bus is intended to be readily used with different payloads, it is advantageous to do away with the individual heaters for each piece of electrical equipment. Instead, a feedback heat control system is associated with each panel. The heat control systems uses thermostats and heaters, represented by 72 of FIG. 2a, located on the inside surfaces of north and south transponder panels 5 and 6, and on the inside surface of earth panel 7. One heater is ordinarily provided for each heat pipe of a network of heat pipes. The set-point temperature and available power are based upon a detailed study of the payload.

FIG. 7 tabulates the characteristics of three spacecraft members of a set of communications spacecraft, intended to launch on three different launch vehicles. The three different versions are designated by column headings 1a, 1b and 1c. As tabulated in Row I, the launch vehicles are Atlas II, Delta II, and Ariane 4. The characteristics of the spacecraft bus and payload in Rows II through V are self-evident. The payload set of Row VI represents the number of communication channels, the design transmission watts per channel, and the frequency band. Thus, in the "1a" column, the spacecraft carries 24 12-watt C-band amplifiers, and another 24 60-watt Ku-band amplifiers, for a total of 48 channels. The antennas listed in Row VIII of FIG. 7 are dual-surface (DUAL SURF), frequency reuse by polarization diversity types. The 1a column lists a total of 2 antennas, each with a reflector diameter ($\phi$) of 85 inches. The other two versions tabulated in FIG. 7 each carry one dual-surface 60-inch diameter reflector. The remaining items in FIG. 7 are self-explanatory.

Figure 8C:
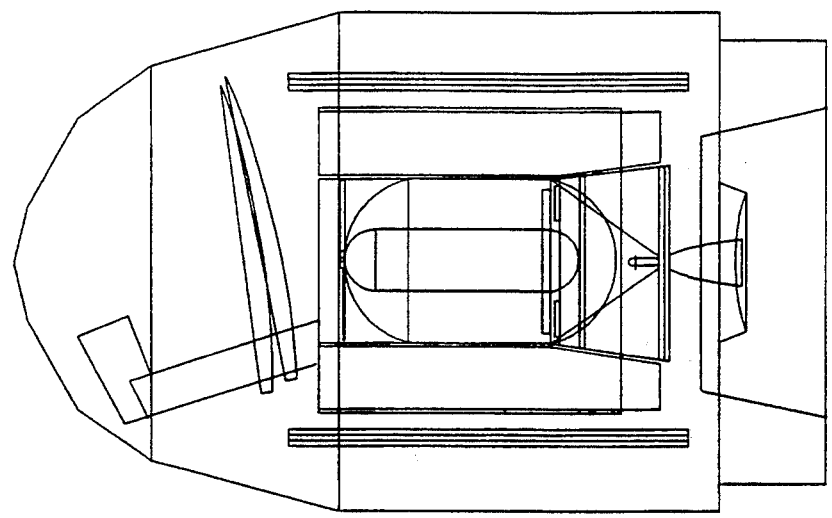
FIGS. 8a, 8b and 8c illustrate, in simplified elevation view, spacecraft of a set of spacecraft, associated with their launch vehicles.
Figure 8B:
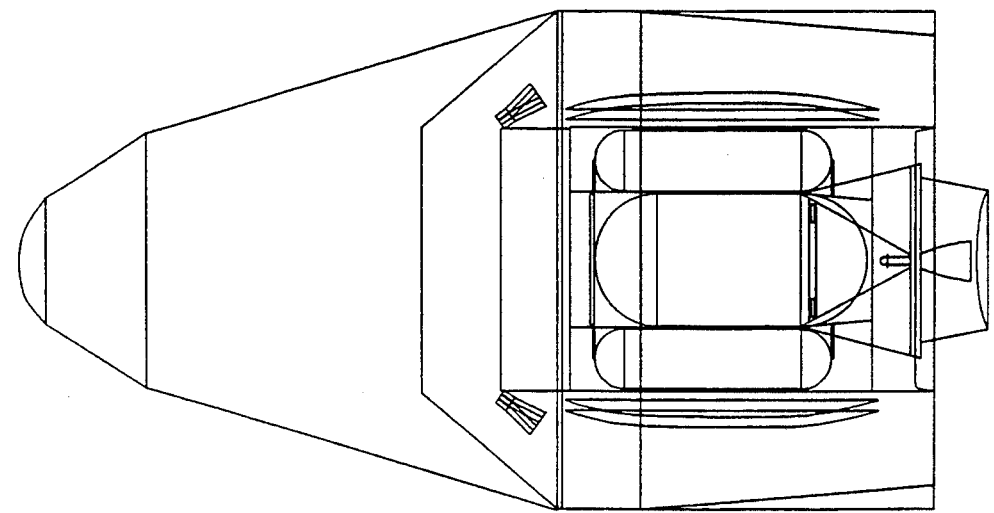
Figure 8A:
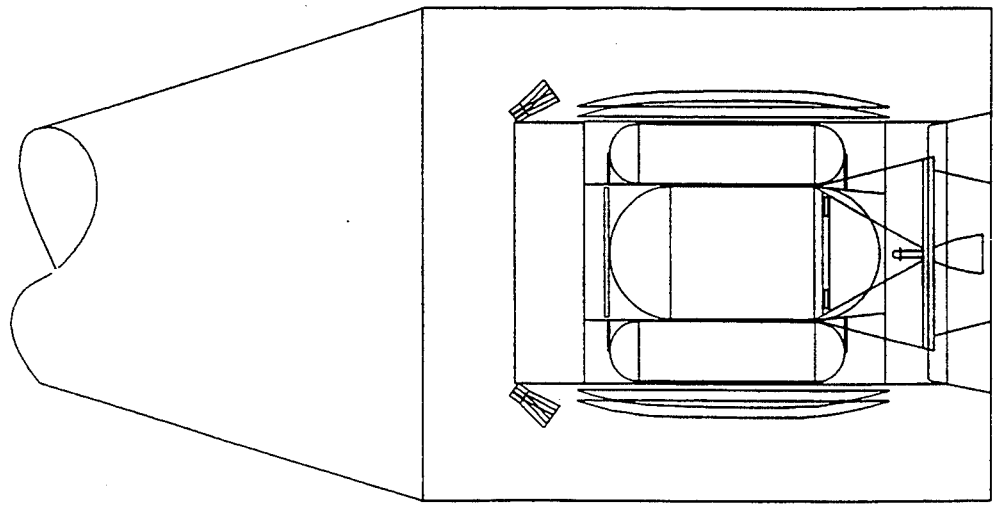

FIGS. 8a, 8b and 8c are simplified elevation outline views of the three spacecraft tabulated in columns 1a, 1b and 1c of FIG. 7, respectively, mounted on their boosters, ready for launch.

Other embodiments of the invention will be apparent to those skilled in the art. For example, if monopropellant thrusters are used exclusively, the fuel and oxidizer tanks described and illustrated may instead be monopropellant tanks, and more or fewer tanks than illustrated may be used. While panels have been designated "north", "south", "earth" and the like, these designations do not necessarily refer to their orientation in all possible spacecraft applications. While the number of heat pipes in transponder panels 5 and 6 has been described as being the same, they may be different if the heat loads warrant. While heat pipes are illustrated as being used, low-power-dissipation payloads may be carried on spacecraft without heat pipes for payload heat.

What is claimed is:

1. A member of a set of spacecraft, each member spacecraft of said set defining a longitudinal axis which is longitudinal during launch, said set of spacecraft including member spacecraft having overall longitudinal dimensions parallel to said longitudinal axis which differ, among members of said set, by a dimension which is a multiple, including the integer one, of a predetermined incremental dimension, each said member comprising:

at least one propellant tank including (a) an axis parallel to said longitudinal axis, and cross-sectional dimensions orthogonal to said axis of said propellant tank, said cross-sectional dimensions of said propellant tank being identical to those of a corresponding propellant tank of other members of said set of spacecraft, and (b) dimensions in the direction of said axis of said propellant tank which differ from those of other members of said set by an integer multiple of said predetermined incremental dimension, where said integer multiple may include the integer one; and a launch vehicle adapter, including first and second ends and a longitudinal axis, said launch vehicle adapter having a circular cross-section at said first end and a polygonal cross-section at said second end, said first end being free, and available for coupling to a launch vehicle, said adapter including a smooth transition between said first and second ends, the circumference of said transition, along any path thereabout intersection an orthogonal to said longitudinal axis, being equal to that along any other such path.

2. A member according to claim 1, wherein said polygonal cross-section is a rectangular cross-section.

3. A member according to claim 2, wherein said rectangular cross-section is square.

4. A member according to claim 1, wherein the corners of said polygonal cross-section are rounded.

5. A member according to claim 1, wherein the material of said adapter is a hardenable liquid, impregnated with filaments of reinforcing material, at least some of which filaments are wound thereabout in directions having components parallel to said longitudinal axis.

6. A member according to claim 1, in which said predetermined incremental dimension is about five inches.

7. A member of a set of spacecraft, each member spacecraft of said set defining a longitudinal axis which is longitudinal during launch, said set of spacecraft including member spacecraft having overall longitudinal dimensions parallel to said longitudinal axis which differ, among members of said set, by a dimension which is a multiple, including the integer one, of a predetermined incremental dimension, each said member comprising:
 at least one propellant tank including (a) an axis parallel to said longitudinal axis, and cross-sectional dimensions orthogonal to said axis of said propellant tank, said cross-sectional dimensions of said propellant tank being identical to those of a corresponding propellant tank of other members of said set of spacecraft, and (b) dimensions in the direction of said axis of said propellant tank which differ from those of other members of said set by an integer multiple of said predetermined incremental dimension, where said integer multiple may include the integer one; and
 at least one heat pipe including (a) an axis of elongation parallel to said longitudinal axis, and cross-sectional dimensions orthogonal to said axis of elongation of said heat pipe, said cross-sectional dimensions of said heat pipe being identical to those of a corresponding heat pipe of another member of said set of spacecraft, and (b) dimensions in the direction of said axis of elongation of said heat pipe which differ from those of other members of said set by an integer multiple of said predetermined incremental dimension.

8. A member of a set of spacecraft, each member spacecraft of said set defining a longitudinal axis which is longitudinal during launch, said set of spacecraft including member spacecraft having overall longitudinal dimensions parallel to said longitudinal axis which differ, among members of said set, by a dimension which is a multiple, including the integer one, of a predetermined incremental dimension, each said member comprising:
 at least one propellant tank including (a) an axis parallel to said longitudinal axis, and cross-sectional dimensions orthogonal to said axis of said propellant tank, said cross-sectional dimensions of said propellant tank being identical to those of a corresponding propellant tank of other members of said set of spacecraft, and (b) dimensions in the direction of said axis of said propellant tank which differ from those of other members of said set by an integer multiple of said predetermined incremental dimension, where said integer multiple may include the integer one; and
 a spacecraft solar array panel which may assume a stowed state and a deployed state, and which in said stowed state includes an axis parallel to said longitudinal axis, and stowed-state cross-sectional dimensions orthogonal to said axis of said solar array panel, said solar array panel having (a) said cross-sectional dimensions identical to those of a corresponding solar array panel of another member of said set of spacecraft, and (b) dimensions in the direction of said axis of said solar array panel which differ from those of other members of said set by an integer multiple, which may equal said integer multiple of said predetermined incremental dimension.

9. A member according to claim 8, further comprising:
 a flat support panel including a thermal transfer surface portion;
 a plurality of first heat pipes, each of said first heat pipes including an elongated portion and a shorter portion extending orthogonally relative to said elongated portion, to define a heat pipe plane, said heat pipe plane of each of said first heat pipes lying parallel to said flat support panel, said first heat pipes being placed in thermal contact with said thermal transfer surface portion of said support panel, at locations spaced apart by the length of said shorter portions of said first heat pipes, with said elongated portions of said first heat pipes mutually parallel and parallel to said longitudinal axis, and with said first heat pipes coaxial;
 a plurality of second heat pipes, each of said second heat pipes including an elongated portion and a shorter portion extending orthogonally relative to said elongated portion, to define a heat pipe plane, said heat pipe plane of each of said second heat pipes lying parallel to said flat support panel, said second heat pipes being placed in thermal contact with said thermal transfer surface portion of said support panel, at locations spaced apart by the length of said shorter portions of said second heat pipes, with said elongated portions of said second heat pipes mutually parallel, and with said shorter portions of said second heat pipes coaxial, said second heat pipes being located such that said coaxial shorter portions of said first and second heat pipes are mutually parallel but not coaxial, and such that a portion of said elongated portion of each of said first heat pipes is juxtaposed and in contact with a portion of said elongated portion of a corresponding one of said second heat pipes; and
 a first header heat pipe extending the length of, and in contact with, said shorter portion of said first heat pipes; and
 a second header heat pipe extending the length of, and in contact with, said shorter portions of said second heat pipes.

10. A member according to claim 9, further comprising feedback-controlled heating means coupled to said panel, for tending to maintain the temperature of said panel constant.

11. A member according to claim 8, further comprising:
 a first panel, said first panel including at least (a) a surface portion, (b) a thermal transfer region extending across a portion of said first panel, (c) at least first and second mutually parallel heat pipes extending, parallel to said longitudinal axis, across different portions of said first panel without said thermal transfer region and in thermal contact with said surface portions, said first and second heat pipes each including terminal regions lying within said heat transfer region of said first panel, said terminal regions of said first and second heat pipes lying along a first heat transfer axis;

a second panel, said second panel including at least (a) a surface, (b) a thermal transfer edge region, (c) at least third and fourth heat pipes extending, in a plane perpendicular to said longitudinal axis, across different portions of said second panel without said thermal transfer edge region and in thermal contact with said surface of said second panel, each of said third and fourth heat pipes including a terminal region within said thermal transfer edge region, said terminal region of said third and fourth heat pipes lying along a second heat transfer axis parallel with said first heat transfer axis;

a header heat pipe extending parallel to said first and second heat transfer axes; and means for physically coupling said thermal transfer edge region of said second panel to said thermal transfer region of said first panel and to said header heat pipe, with said terminal regions of said first and second heat pipes closely coupled thermally to said terminal region of said third and fourth heat pipes and to said header heat pipe.

12. A spacecraft according to claim 11, wherein said means for physically coupling includes:

a plurality of removable fastening means for coupling said first and second panels together in their respective thermal coupling regions; and permanent mounting means coupled to said header heat pipe and to said thermal coupling region of one of said first and second panels.

13. A spacecraft according to claim 12, wherein said permanent mounting means comprises adhesive.

14. A member of a set of spacecraft, each member spacecraft of said set defining a longitudinal axis which is longitudinal during launch, said set of spacecraft including member spacecraft having overall longitudinal dimensions parallel to said longitudinal axis which differ by at least one predetermined incremental dimension among members of said set, each said member comprising:

at least one propellant tank including (a) an axis parallel to said longitudinal axis, and cross-sectional dimensions orthogonal to said axis of said propellant tank, said cross-sectional dimensions of said propellant tank being identical to those of a corresponding propellant tank of other members of said set of spacecraft, and (b) dimensions in the direction of said axis of said propellant tank which differ from those of other members of said set by an integer multiple of said predetermined incremental dimension, where said integer multiple may include the integer one;

at least one heat pipe including (a) an axis of elongation parallel to said longitudinal axis, and cross-sectional dimensions orthogonal to said axis of elongation of said heat pipe, said cross-sectional dimensions of said heat pipe being identical to those of a corresponding heat pipe of another member of said set of spacecraft, and (b) dimensions in the direction of said axis of elongation of said heat pipe which differ from those of other members of said set by an integer multiple of said predetermined incremental dimension; and a spacecraft solar array panel which may assume a stowed state and a deployed state, and which in said stowed state includes an axis parallel to said longitudinal axis, and stowed-state cross-sectional dimensions orthogonal to said axis of said solar array panel, said solar array panel having (a) said cross-sectional dimensions identical to those of a corresponding solar array panel of another member of said set of spacecraft, and (b) dimensions in the direction of said axis of said solar array panel which differ from those of other members of said set by an integer multiple, which may equal said integer multiple, of said predetermined incremental dimension.

* * * * *

UNITED STATES PATENT AND TRADEMARK OFFICE
CERTIFICATE OF CORRECTION

PATENT NO. : 5,344,104
DATED : 9/6/94
INVENTOR(S) : Homer et al.

It is certified that error appears in the above-identified patent and that said Letters Patent is hereby corrected as shown below:

In Claim 1,
Column 12, line 62, change "intersection" to --intersecting--.

Signed and Sealed this

Sixteenth Day of July, 1996

Attest:

BRUCE LEHMAN

Attesting Officer

Commissioner of Patents and Trademarks